(12) United States Patent
Herbruck

(10) Patent No.: US 8,733,317 B2
(45) Date of Patent: May 27, 2014

(54) ROTARY, INTERNAL COMBUSTION ENGINE

(75) Inventor: Steve Herbruck, Ojai, CA (US)

(73) Assignee: Gotek Energy, Inc., Oak View, CA (US)

( * ) Notice: Subject to any disclaimer, the term of this patent is extended or adjusted under 35 U.S.C. 154(b) by 1174 days.

(21) Appl. No.: 12/637,595

(22) Filed: Dec. 14, 2009

(65) Prior Publication Data

US 2011/0139116 A1 Jun. 16, 2011

(51) Int. Cl.
*F02B 53/00* (2006.01)
(52) U.S. Cl.
USPC .......... 123/241; 123/243; 123/43 R; 418/176; 418/261; 418/262; 418/263; 418/265
(58) Field of Classification Search
USPC ........ 123/241, 243, 43 R; 418/176, 261, 262, 418/263, 265, 268
See application file for complete search history.

(56) References Cited

U.S. PATENT DOCUMENTS

| | | | | | |
|---|---|---|---|---|---|
| 1,048,308 | A | * | 12/1912 | Hanley | 123/241 |
| 1,349,353 | A | * | 8/1920 | Wilber, Jr. | 123/227 |
| 1,400,255 | A | | 12/1921 | Anderson | |
| 1,715,490 | A | * | 6/1929 | Ballerstedt | 418/183 |
| 1,790,256 | A | * | 1/1931 | Wright | 123/241 |
| 2,263,361 | A | * | 11/1941 | Lawrence, Jr. | 418/260 |
| 2,328,799 | A | | 9/1943 | Gaylord | |
| 2,938,505 | A | * | 5/1960 | Quartier | 123/222 |
| 3,306,269 | A | * | 2/1967 | Dimmock, Jr. | 123/227 |
| 3,364,908 | A | * | 1/1968 | Herpolsheimer | 123/241 |
| 3,373,723 | A | * | 3/1968 | Blosser | 123/216 |
| 3,438,358 | A | * | 4/1969 | Porsch et al. | 123/241 |
| 3,793,998 | A | * | 2/1974 | Yokoi et al. | 123/43 R |
| 3,855,977 | A | * | 12/1974 | Statkus | 123/43 C |
| 3,874,346 | A | * | 4/1975 | Freitas | 123/18 R |
| 3,923,013 | A | * | 12/1975 | Myers | 123/241 |
| 3,939,808 | A | | 2/1976 | Kosecki et al. | |
| 3,951,112 | A | | 4/1976 | Hunter | |
| 4,010,716 | A | | 3/1977 | Minka | |
| 4,034,718 | A | * | 7/1977 | Snider | 123/241 |
| 4,072,132 | A | | 2/1978 | Lindros | |
| 4,537,162 | A | * | 8/1985 | Kienle | 123/43 R |
| 4,662,177 | A | | 5/1987 | David | |
| 5,230,321 | A | | 7/1993 | Lambert et al. | |
| 5,261,365 | A | * | 11/1993 | Edwards | 123/241 |
| 5,345,905 | A | * | 9/1994 | Edwards | 123/241 |

(Continued)

OTHER PUBLICATIONS

World Intellectual Property Organization, International Search Report and Written Opinion for International Application No. PCT/US10/60289, Mail Date Feb. 17, 2011.

(Continued)

*Primary Examiner* — Thomas Denion
*Assistant Examiner* — Patrick Maines
(74) *Attorney, Agent, or Firm* — Armstrong Teasdale LLP

(57) ABSTRACT

A rotary engine has a rotor that has rockers pivoting in chambers. As each rocker pivots, it rotates an outer crankshaft. Each outer crankshaft has a spur gear that engages a stationary ring gear. Spur gear rotation causes the gears and the outer crankshafts to revolve around the ring gear. This cause the rotor to rotate. As the rotor rotates, successive chambers are positioned at the intake, compression, ignition, and exhaust positions. Igniting the fuel in the ignition position pushes the rocker inward to rotate the outer crankshaft associated with that rocker to cause the rotor to rotate.

16 Claims, 13 Drawing Sheets

(56) References Cited

U.S. PATENT DOCUMENTS

| | | | |
|---|---|---|---|
| 5,563,576 A | 10/1996 | Drori et al. | |
| 6,349,679 B1 | 2/2002 | Mashimo et al. | |
| 6,439,868 B1 | 8/2002 | Tomoiu | |
| 6,457,450 B1 | 10/2002 | Luzhkov | |
| 6,505,106 B1 | 1/2003 | Lawrence et al. | |
| 6,668,767 B1 * | 12/2003 | Sanchez Talero et al. | 123/43 R |
| 6,688,276 B2 * | 2/2004 | Baptista et al. | 123/226 |
| 6,729,296 B2 | 5/2004 | King | |
| 6,776,135 B1 | 8/2004 | Chen et al. | |
| 7,143,737 B2 | 12/2006 | Kim | |
| 7,156,068 B2 | 1/2007 | Yüksel | |
| 7,255,086 B2 | 8/2007 | Kovalenko | |
| 7,343,894 B2 | 3/2008 | Leon | |
| 7,350,501 B2 | 4/2008 | Watkins et al. | |
| 7,353,784 B2 | 4/2008 | Nicholson, IV | |
| 7,478,619 B2 | 1/2009 | Patrono | |
| 7,578,278 B2 * | 8/2009 | Peitzke et al. | 123/241 |
| 8,261,715 B2 * | 9/2012 | Samuels | 123/223 |
| 2006/0150949 A1 * | 7/2006 | Kovalenko | 123/241 |
| 2007/0186897 A1 | 8/2007 | Nicholson | |
| 2008/0008364 A1 | 1/2008 | Huang et al. | |
| 2008/0133088 A1 | 6/2008 | Yamada | |
| 2008/0259160 A1 | 10/2008 | Morimitsu et al. | |
| 2008/0295489 A1 * | 12/2008 | Elfvik | 60/277 |
| 2009/0157255 A1 | 6/2009 | Plante | |
| 2009/0228187 A1 | 9/2009 | Nakamura | |
| 2010/0194887 A1 | 8/2010 | Ono et al. | |

OTHER PUBLICATIONS

Notice of Final Rejection (in both English and Korean) from the Korean Intellectual Property Office for application No. 10-2012-7018493; Dec. 24, 2013; 5 pages.

* cited by examiner

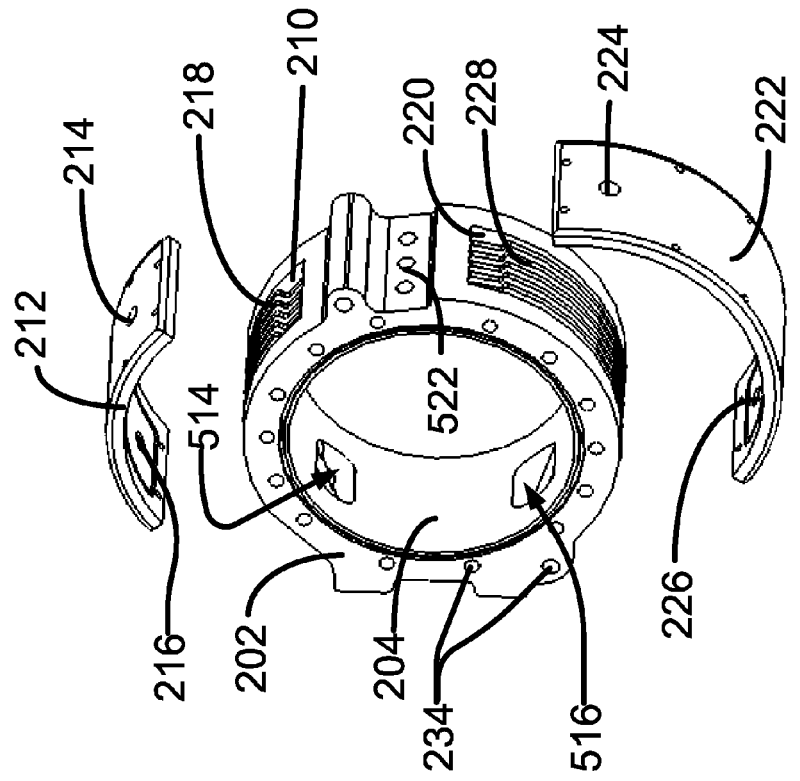
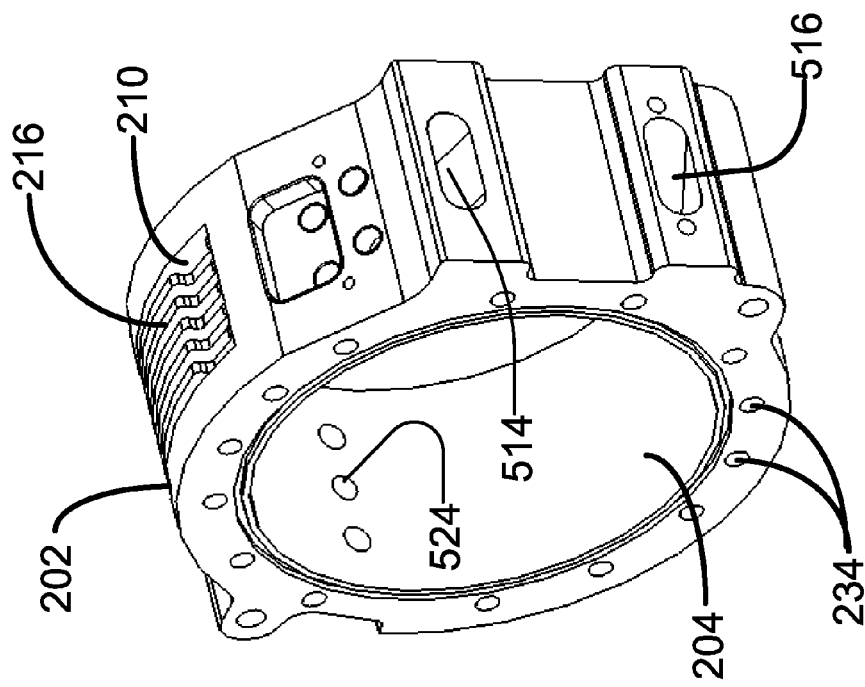
Fig. 10
Fig. 9

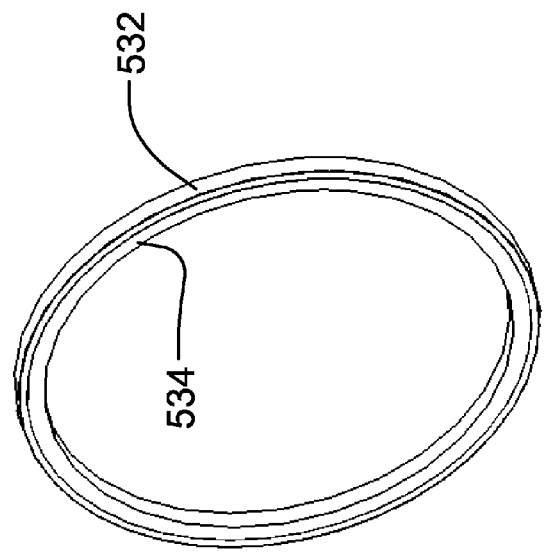
Fig. 18
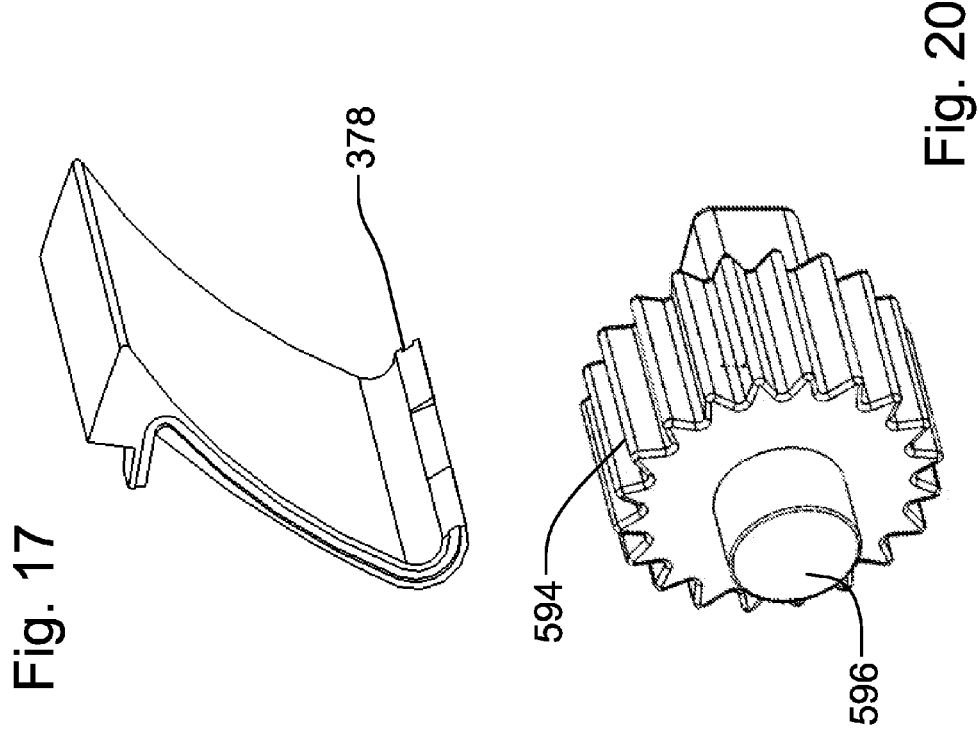
Fig. 17
Fig. 20

ROTARY, INTERNAL COMBUSTION ENGINE

NOTICE OF COPYRIGHTS AND TRADE DRESS

A portion of the disclosure of this patent document contains material that is subject to copyright protection. This patent document may show or describe matter that is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

Rotary, internal combustion engines.

2. General Background and State of the Art

Internal combustion engines burn fuel in their combustion chambers in the presence of oxygen (usually from air). Burning generates high temperature and pressure gases, which expand and apply force against movable engine parts. Movement of the parts produce mechanical energy. Thus, an internal combustion engine converts potential chemical energy in the fuel into kinetic mechanical energy. Therefore, they provide the power for practical mechanical work to move vehicles and run pumps and other equipment.

Internal combustion engines fall into two principal categories, intermittent and continuous. Piston engines, either four-stroke and two-stroke, are the most common intermittent engines. Less common rotary engines also are intermittent. Continuous combustion engines include gas turbines and jet engines.

Internal combustion engines find their most common use in vehicles including cars, trucks, busses, airplanes and ships. The ratio of the potential chemical energy of the fuel (normally gasoline or diesel fuel) to the weight of the fuel is high. Consequently, internal combustion engines can travel long distance while carrying all their fuel.

Gasoline piston engines are among the least efficient internal combustion engine, only about 25%-30% efficient. Direct injection diesel engine may be about 40% efficient, at least at lower RPMs. Gas turbines are among the most efficient—approximately 60% efficient at high revolutions. However, gas turbines are inefficient at low revolutions. Because most land vehicle engines operate close to idle or well below maximum RPM, gas turbines usually are impractical for most land vehicles.

Rotary internal combustion engines surfaced in the early 1900s. See Hanley, U.S. Pat. No. 1,048,308 (1912). The Wankel rotary engine, which was developed beginning in the 1960s, became commercialized. See U.S. Pat. Nos. 2,938,505, 3,306,269, 3,373,723, 3,793,998, 3,855,977, 3,923,013 and 4,072,132. The Wankel engine is an internal combustion engine that uses a rotary design instead of reciprocating pistons to convert the energy of expanding combustion gases into rotating motion. Its four-stroke cycle takes place in a space between the inside of an oval-like epitrochoid-shaped housing and a rotor that is similar in shape to a Reuleaux triangle. The public often refers to the Wankel engine as the "rotary engine," but rotary engines may have other constructions.

Internal combustion engines compress an air-fuel mixture in a combustion chamber and ignite the fuel by an electric spark or ultra high compression. The resulting combustion expands the gases to transform chemical energy into mechanical energy.

The combustion chamber in a gas turbine is between two sets of opposing fan blades. The fan blades compress the air mixture. When fuel is introduced and ignited, the combustion products expand against downstream fan blades causing the blades to rotate. The energy from the blade rotation drives the vehicle or other device.

BRIEF DESCRIPTION OF THE DRAWINGS

FIG. 9 is a perspective front view of the housing of the rotary engine's rotor.

FIG. 10 is a perspective rear view of the housing of the rotary engine's rotor showing the cooling jackets.

FIG. 17 is a perspective view of a replacement part for part of the rotor.

FIG. 18 is a perspective view of a seal used in the device.

FIG. 20 is a perspective view of an alternative spur gear.

Figure 1:
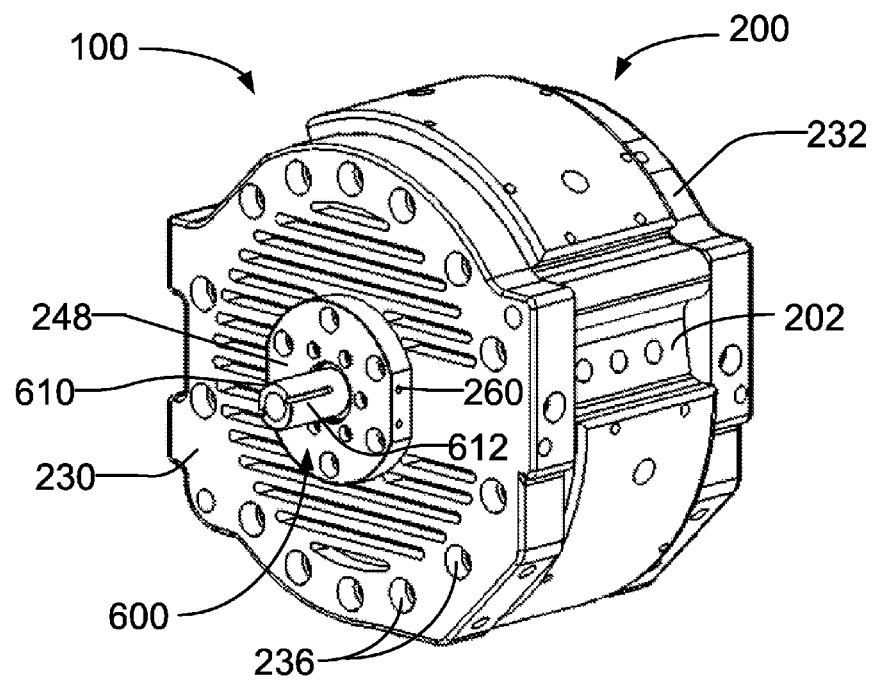
FIG. 1 is perspective view of the rotary engine.

When the detailed description discusses a reference numeral in one or more drawing figures, the element and reference numeral being discussed is visible in that drawing. The element also may be visible in other figures without its reference numeral to avoid crowding of reference numerals.

SUMMARY

A rotary engine has a rotor that has rockers pivoting in chambers inside an enclosed cylindrical housing. As each rocker pivots, it rotates an outer crankshaft. Each outer crankshaft has a spur gear that engages a stationary ring gear. Spur gear rotation causes the gears and the outer crankshafts to revolve around the ring gear. This causes the rotor to rotate.

As the rotor rotates, successive chambers are positioned at the intake, compression, ignition, and exhaust positions. In the intake position, the rocker pivots into its chamber to draw the air-fuel mixture into the chamber. The rocker pivots outward in the compression position. Igniting the fuel in the ignition position pushes the rocker inward, and the rocker moves outward again in the exhaust position to exhaust the combustion products.

DETAILED DESCRIPTION

Rotary engine 100 (FIGS. 1 and 2) has the following principal components: (1) housing 200 for housing other components and for mounting in a vehicle or other de-vice; (2) power module 300 and output member, i.e. output 600. See FIG. 2.

Housing 200 (FIGS. 1, 4, 9 and 10) may include a generally cylindrical housing body 202 of 8620, 8514 or other steel alloy. Aluminum or other suitable materials also could be used. The housing has a cylindrical inner wall 204. The inner wall also could be a steel insert inside an aluminum outer housing body.

The housing may be air- or water-cooled. If water-cooled, the housing body may have top and bottom water troughs 210 and 220 (FIGS. 9 and 10). Top water jacket 212, which covers the top water trough, has inlet 214 and outlet 216 (FIG. 10). Likewise, bottom water jacket 222, which covers the bottom water trough, has inlet 224 and outlet 226. The inlets may receive coolant from a radiator or other heat exchanger, and the outlets return the coolant to the radiator. Hoses connecting the inlet and outlet to the radiator are not shown. The troughs may have vanes 218 and 228 of heat conductive material to transfer heat from the housing to the coolant. The vanes also may direct the coolant to flow from the inlet to the outlet. In addition, one could change the locations of the inlet and outlet.

Figure 2:
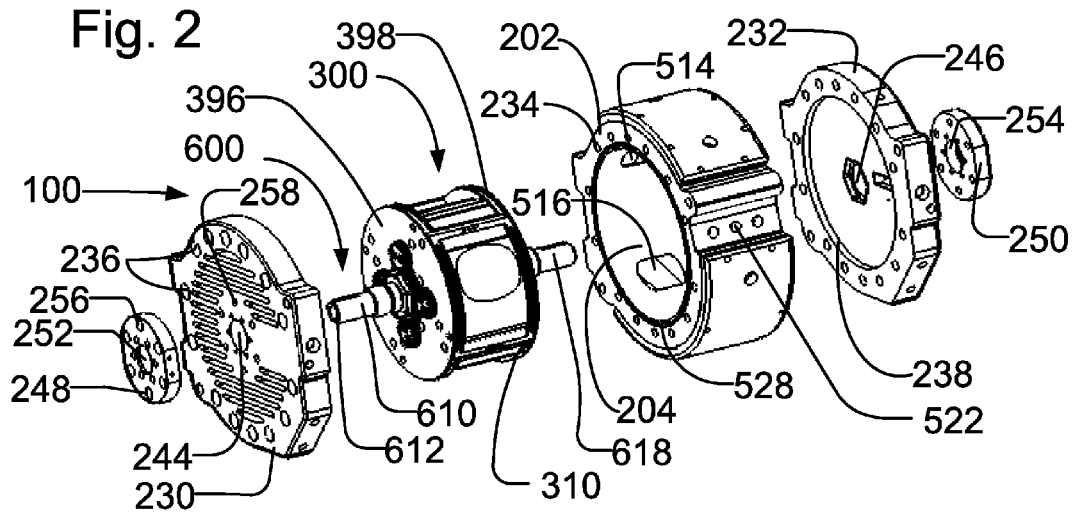
FIG. 2 is an exploded view of the rotary engine.

Front plate 230 and rear plate 232 enclose housing 200 (FIGS. 1 and 2). The plates may be 6061 aluminum or other suitable material. The terms "front" and "rear" are used with reference to the drawings, not necessarily with reference to a vehicle or another device in which the rotary engine mounts. Housing body 202 has circumferentially spaced bores extending into the front and back of the housing body. Only the bores 234 on the front are visible. See FIGS. 2, 4, 9 and 10. Bolts or other fasteners (not shown) extend through corresponding holes 236 in the front plate and lock into the bores. Housing body 202 may have openings and ports that are discussed in more detail below.

The front and rear plates 230 and 232 may include an oil ring seal groove 238 (only shown on plate 232 in FIG. 2). Corresponding ring seals (see seal 532 in FIG. 18) seat in the ring seal grooves to create a seal when the plates attach to housing body 202. Gaskets (not shown) also may seal the plates to the housing body. Other devices or systems may be provided to prevent galvanic corrosion due to the dissimilar metals.

Figure 5:
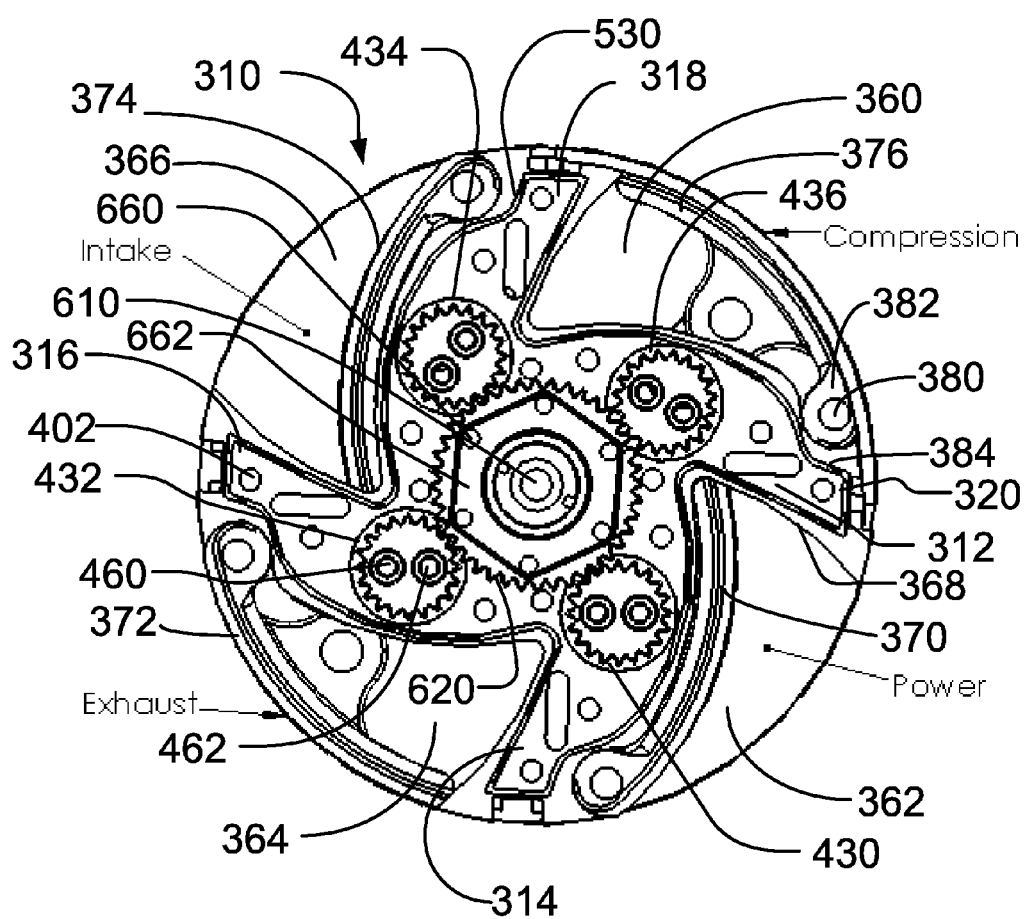
FIG. 5 is a front view of the internal parts of the rotary engine's rotor.
Figures 6A, 6B:
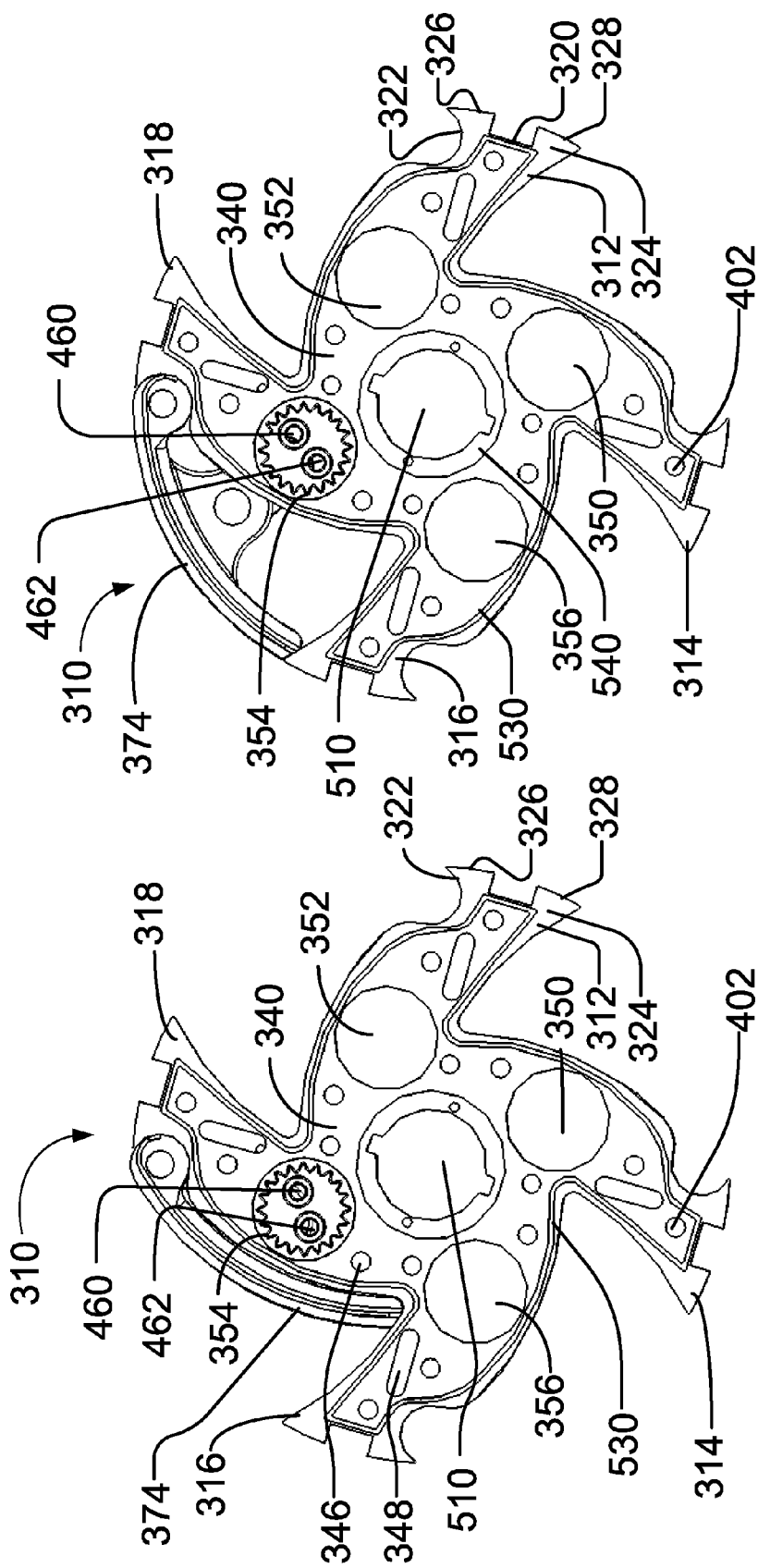
FIGS. 6a and 6b are partial front views of the rotary engine's rotor.

Power module 300 mounts within housing body 202. See FIGS. 2 and 4. The power module includes rotary module or rotor 310 that rotates about an axis of rotation within the housing body. The rotor may be formed of 8620 or 8514 steel or ductile iron. The rotor may have four arms 312, 314, 316 and 318 (FIGS. 5, 6a, 6b and 11). The distal end of each arm, e.g., end 320 of arm 312 (FIGS. 5, 6a and 6b), has two short, spaced-apart extensions 322 and 324 (FIGS. 6a and 6b). The outer faces 326 and 328 (FIGS. 3, 6a and 6b) may have surfaces that conform to inside cylindrical wall 204 of housing body 202. Pressure plates 330 (FIG. 3), which may be 9254 steel, seat in the space between extensions 322 and 324. Spring 332, which may be made of Incoloy® alloy, urges the pressure plate 330 to push seals 306 and 308 (FIG. 3) to seal against the inside cylindrical wall. The pressure plate seals and the arm extensions such as extensions 322 and 324 seal the distal ends of the arms to the inside cylindrical surface of the housing body. Remaining arms 314, 316 and 318 have similar arrangements.

Figure 11:
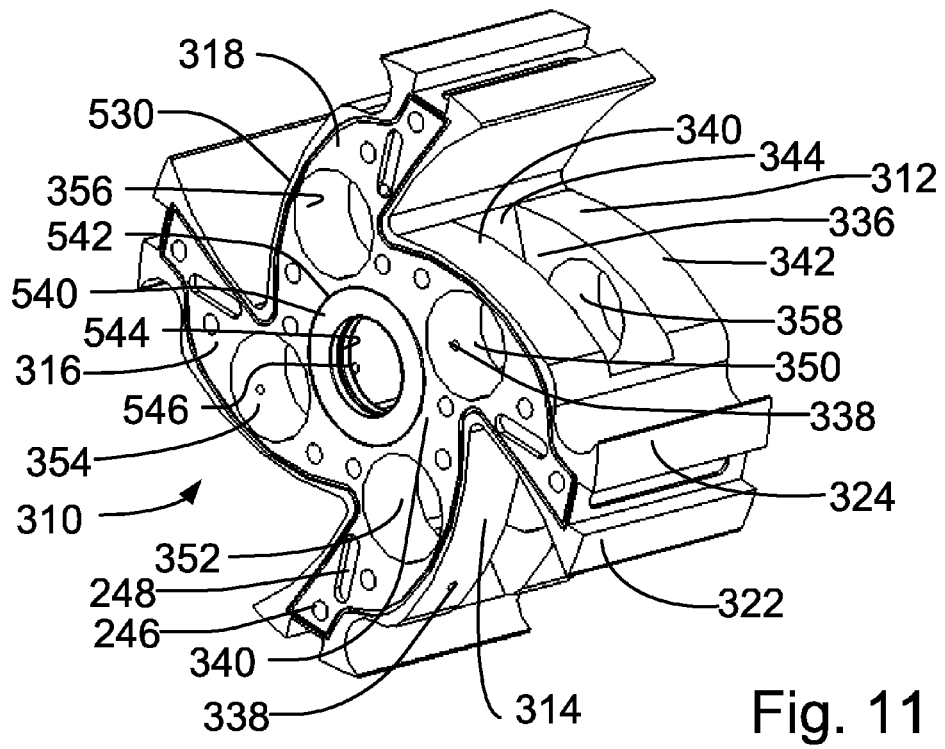
FIG. 11 is a perspective view of the rotary engine's rotor.

Arms 312, 314, 316 and 318 may be formed from two plates 340 and 342 that extend outward from a center portion, i.e., hub 344 (FIG. 11) and form hollow space 336. Only the plates that form arm 312 in FIG. 11 are numbered. The hollow space is used by outer crankshafts as described below. In addition, having spaced-apart plates may decrease rotor mass and increase efficiency.

Plates for arms 312, 314, 316 and 318 may have aligned bores. FIG. 11 shows bores 350, 352, 354 and 356 in plate 340. Only bore 358 in plate 342 is visible. As FIGS. 6a and 6b show, bores 350, 352, 354 and 356 align with corresponding bores in plate 342, which are not visible in FIGS. 6a and 6b.

The space between one arm and its adjacent arm and inside cylindrical wall 204 of housing body 202 forms a chamber. Thus, chamber 360 (FIG. 5) is formed between arms 312 and 318, and the spaces between arms 312 and 314, 314 and 316 and 316 and 316, form chambers 362, 364 and 366, respectively.

Figure 3:
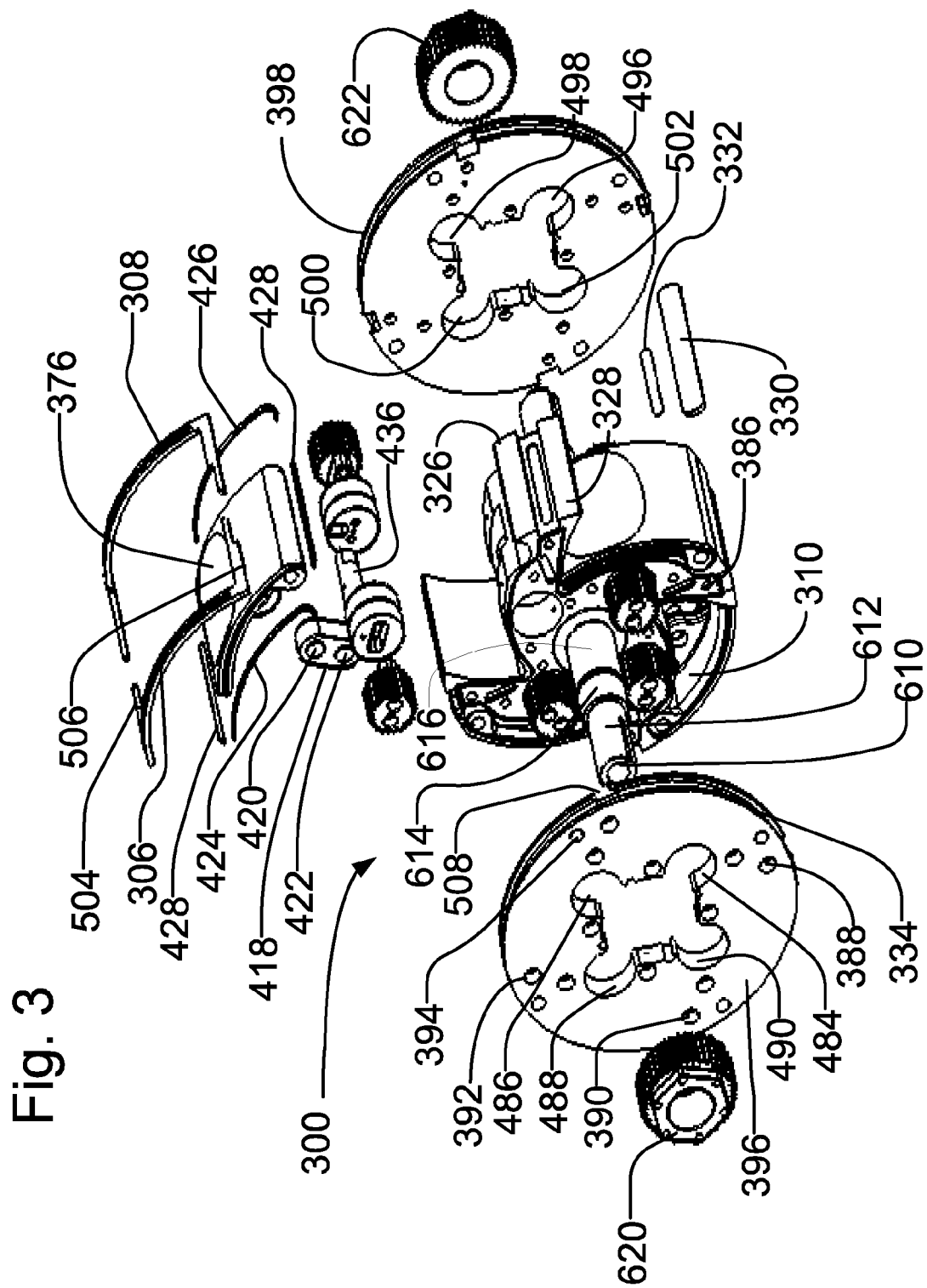
FIG. 3 is an exploded view of the rotary engine's power module.
Figure 7:
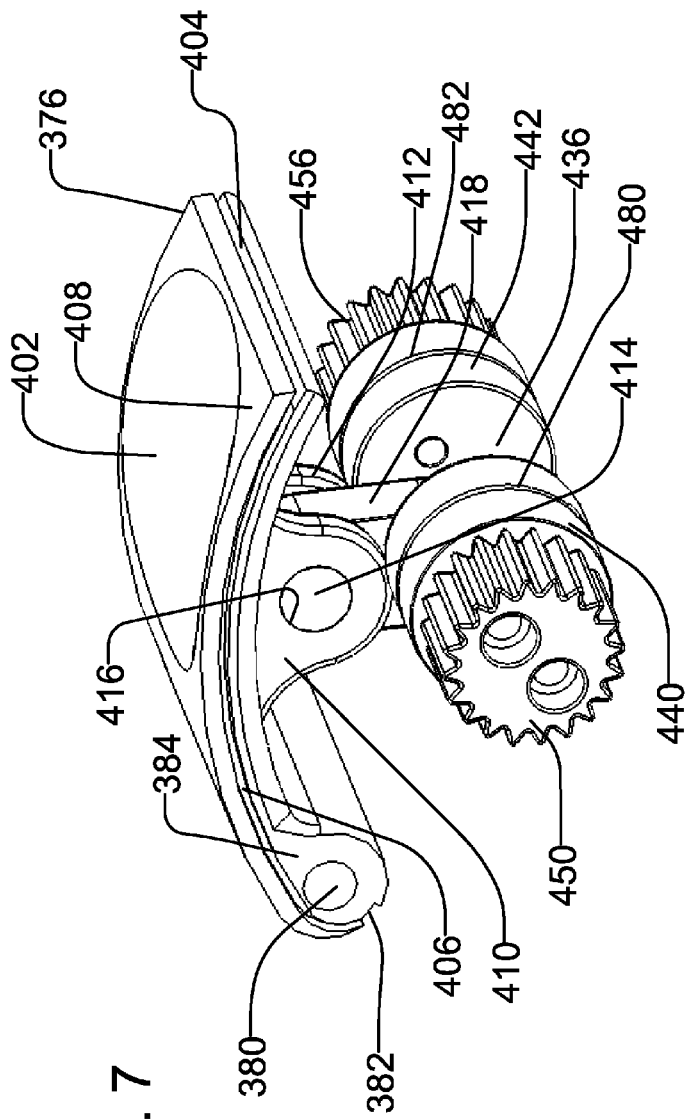
FIG. 7 is perspective view of the rotary engine's rocker.

One of four rockers 370, 372, 374 and 376 mounts for pivoting in each chamber 360, 362, 364 and 366. FIG. 3 shows rocker 376 exploded from the rotor, FIG. 5 shows all the rockers in relation to rotor 310, FIGS. 6a and 6b shows only two rotors moved between different positions, and FIG. 7 shows details of the rocker. The rockers may be formed from 4032 aluminum or other appropriate material.

Pivot pin 380 extends through ridge 382 of each rocker (FIG. 7 and only numbered for rocker 376 in FIG. 5). The ridge mounts in rounded portion 384 of each arm 312, 314, 316 and 318. The outer surface of the ridge cooperates with the surface of the rounded portion to seal the ridge and rounded portion intersection as the rocker pivots. Added structure may be provided to enhance the seal at the ridge such as a sealing member 428 (FIG. 3) in groove 382 (FIG. 7). The rocker may have a front groove 404 and side grooves, only one of which, groove 406, is visible FIG. 7. Side compression seals 424 and 426 (FIG. 3) mount in the side grooves and front compression seal 428 seats in the front groove. They may be 5254 steel. The side compression seals contact the inside of front ring plate 396 and rear ring plate 398 when the ring plates are mounted to the outside of rotor 310. See FIG. 3. The front compression seal contacts the rocker face of each rotor arm, e.g., face 368 of arm 312 (FIG. 5). The rocker faces may be arcuate around the axis of each pivot pin. The rocker faces also close off the space between the two plates. Seals 306 and 308 (FIG. 3) may seat in circumferential grooves 334 of ring plates 396 and 398 (only the groove in ring plate 396 is numbered). Each seal may have inward facing portions 504 and 506 (only the portions on seal 306 is numbered in FIG. 3). The inward facing portions contact each other to form a seal. The inward facing portions may extend from the circumferential grooves though a notch in the ring plate, e.g., notch 508. When the device is assembled, seals 306 and 308 seal the outside of chambers 360, 362, 364 and 366.

One may want to change parts if face 368 (FIG. 5) becomes damaged or worn. Therefore, the rotor may be designed to accept a replacement face on replacement 378 (FIG. 17).

Front and rear ring plates 396 and 398 cover rotor arms 312, 314, 316 and 318, chambers 360, 362, 364 and 366 and rockers 370, 372, 374 and 376. See FIG. 3. The ring plates may be formed of ductile iron. Front ring plate 396 has four cutouts 484, 486, 488 and 490 (FIG. 3). Each aligns with one of the bores 350, 352, 354 or 356 in rotor arm 312, 314, 316 and 318 (FIGS. 6a and 6b). Rear ring plate 398 also has four cutouts 496, 498, 500 and 502 (FIG. 3). Each aligns with a cutout on the front ring plate.

The rockers' pivot pins such as pin 380 may extend into bores such as bores 394 on front ring plate 396 (FIG. 3) and to corresponding bores (not numbered) on rear ring plate 398. The ring plates may be formed of ductile iron. The pivot pins also could extend into recesses, which extend into but not through the ring plates. See also similar but recessed bores in alternative ring plates 492 and 494 in FIGS. 15 and 16. Bores 388, 390 and, 392 and the other unnumbered bores on the ring plate can be used for bolting front rotor ring plate 396 to rotor 310. Corresponding bolts or other fasteners attach rear ring plate 398 to the rotor. The fasteners (not shown) attach to threaded bores 386 (FIGS. 3, 4, 5, 6a and 6b) on rotor arms 312, 314, 316 and 318. The bores' positions used to attach the ring plates can vary. FIG. 3 shows two additional bores for those that are numbered. Thus, each ring plate could be attached by twelve fasteners (four sets of three fasteners) to the rotor.

For positioning by hand, dowels may be used to align appropriate holes, e.g., hole 388 in ring plates 396 or 398, with the appropriate bore 386. Automated assembly may use different techniques.

The following discussion uses rocker 376 as an example for all rockers 370, 372, 374 and 376. Rocker 376 may include two spaced-apart pin bosses 410 and 412 (FIG. 7), which may be integrally formed as part of the rocker. Rocker rod pin 414, which may be 4140 steel, extends through bores 416 in pin boss 410 (only one visible in FIG. 7). The rocker rod pin also extends through the upper bore 420 of link 418 (FIGS. 3 and 7). FIG. 3 also shows the link's lower bore 422. The link also may be 4140 steel.

Rockers 370, 372, 374 and 376 pivot about their respective pivot pins, e.g., pin 380 in rocker 376 (FIG. 5). Each rocker pivots between an outside position, which is close to inside surface 204 of housing body 202, to an inside position away from the inside surface and back to the outside position. Thus, in FIG. 5, rockers 370 and 374 are shown in the inside positions, and rockers 372 and 376 are shown in the outside positions. These positions are temporary because the rockers pivot in and out as described below.

Figure 8:
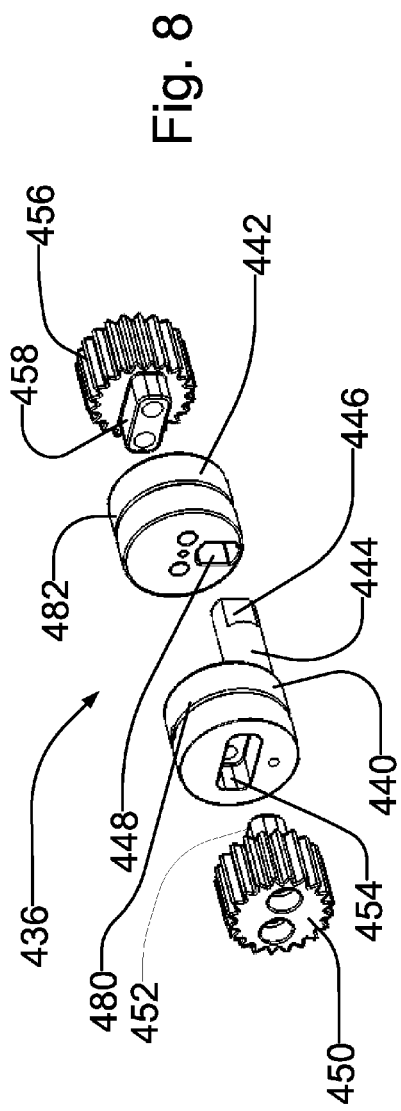
FIG. 8 is perspective view of the small crankshaft of the rotary engine.

Pivoting of each rocker 370, 372, 374 and 376 rotates a corresponding outer crankshaft 430, 432, 434 and 436 (7 and 8). Likewise, rotating an outer crankshaft pivots its corresponding rocker. The outer crankshafts may be made of 4140 steel. Though each could be formed of one piece, FIGS. 7 and 8 show the following parts comprising each outer crankshaft assembly. Crankshaft 436 includes front and rear wheels 440 and 442 (FIGS. 7 and 8). The front wheel includes rearward facing journal 444 that has a tang 446 at its end. The tang seats in tang receiver 448 in rear crank wheel 442 (FIG. 8). Front first driver, i.e., front spur gear 450 includes a tang 452 that seats in tang receiving opening 454 in front wheel 440, and rear first driver, i.e., rear spur gear 456 also includes a tang 458 received within its tang receiving opening (not visible in FIG. 8) in rear crank wheel 442.

Bolts 460 and 462 (FIG. 5 (only two numbered) and FIGS. 6a and 6b) or other fasteners extend through the bolt holes 464 and 466 in front spur gear 450 and through aligned holes 468 and 470 in front crank wheel 440, through aligned holes 472 and 474 in rear crank wheel 442 and into hole 476 and 478 in rear spur gear 456. Threads for engaging the bolts inside the rear spur gear are not visible. Consequently, the bolts secure the front spur gear, the front and rear crank assemblies and the rear spur gear together.

Front and rear wheels 440 and 442 of each outer crankshaft, e.g. crankshaft 436, may have an oil groove 480 and 482 (FIGS. 7 and 8) for lubricating the wheels. The oil grooves may receive lubricant from oil feed 338 (FIG. 11). The oil feed may be angled for ease of machining. Alternatively, the oil feed could be straight by drilling it after drilling through arm plates 340 and 344.

Pressure from gases caused by ignition of fuel in the combustion chamber associated with rocker 376 pivots the rocker inward (i.e., right side moves downward in FIG. 7). Accordingly, the rocker drives link 418 against journal 444 of outer crankshaft 436, which rotates the crankshaft. The parts are dimensioned such that when the rocker reaches in innermost position, the crankshaft journal is at or near its bottom position. Continued rotation of the journal drives the rocker outward. If the rocker is in position other than being pushed by gas expansion and depending on the position of the rocker in its cycle, the crankshaft pulls or pushes the rocker.

Figure 12:
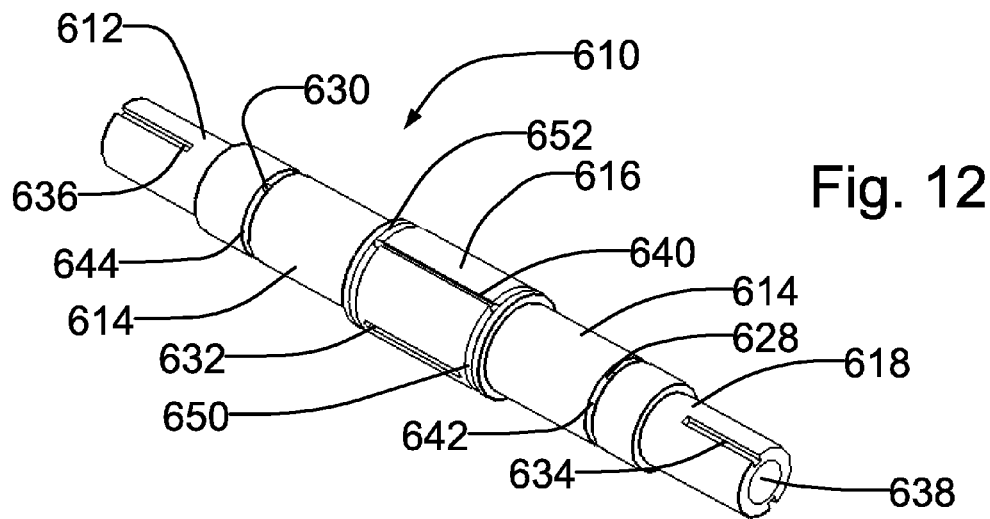
FIG. 12 is a perspective view of the main crankshaft shaft.

Main crankshaft 610 is discussed before discussing the outer crankshafts' operation. The main crankshaft (FIGS. 2, 3, 5 and 12), which may be 4130 steel, provides power from the engine to power a vehicle or produce other useful work. The main crankshaft may be one piece, but the different diameter portions are described as if they were separate parts attached together. The main crankshaft may include a section 616 (FIG. 3), which has a larger diameter than intermediate diameter portions 614. Oil grooves 650 and 652 (FIG. 12) at the ends of the larger diameter section carries oil for lubrication. The main crankshaft also includes smaller diameter flanges 612 and 618 at the crankshaft's end. In addition, sleeve 616 includes a longitudinal keyway 632 (FIG. 12). Although FIG. 12 shows only one keyway, there can be more than one.

The longitudinal center of main crankshaft 610 may be hollow to transfer oil to outside the crankshaft and from one oil hole to another. For example, one or more oil distribution channels 640 (FIG. 12) may extend along the center, larger-diameter section 616 and connect with oil grooves 650 and 652. Likewise, one or more additional circumferential oil troughs 642 and 644 may extend around the outside of the main crankshaft's smaller diameter flanges 612 and 618. Oil feeds 628 and 630 may carry lubricant to the oil troughs. Flanges 612 and 618 may have keyways 634 and 636. The ends of the flanges form bolt holes 638, only one of which is visible in FIG. 12.

Thrust ring 540, which may be bronze, mounts in thrust ring cavity 542 in rotor 310 (FIGS. 6a, 6b and 11), and a corresponding thrust ring mounts on the other side of the rotor. Each thrust ring has a bore 544. Main crankshaft 610 may mount to the rotor as follows. It may be positioned inside cavity 542. The thrust rings are slid over the main crankshaft, and key 546 from each thrust ring engages keyway 640 of sleeve 616.

Main crankshaft 610 extends through second drivers, i.e., ring gears 620 and 622 and ring plates 396 and 398. The ring gears may be 4140 steel. The main crankshaft mounts in bores (only bore 510 is visible in FIGS. 6a, 6b and 11) in the center of arm plates 340 and 342. The ring gears may be fixed against the insides of front plate 230 and rear plate 232 (FIGS. 1 and 2). For example, the ring gears may be fixed to mounting plate 662 and bolts 660 may secure the ring gears and mounting plate to the front and rear plates. The ring gears also may be fixed to other structure.

The teeth of front spur gear 450 and rear spur gear 456, which are associated with outer crankshaft 436 and rocker 376, engage the teeth on ring gears 620 and 622. Likewise, other spur gears on the other outer crankshafts, e.g., 432, 434, 436, associated with the other rockers also engage the teeth on the front or rear ring gear. Because the ring gears are stationary, spur gear rotation causes the spur gears to revolve around the ring gears. The connection of the outer crankshafts including their spur gears to rotor 310 causes the rotor to rotate about the rotor's axis of rotation. That axis coincides with the main crankshaft's axis of rotation.

In the figures, the spur gears travel around the outside of the ring gear. The ring gear could be a planetary gear with internal teeth so that the spur gears would travel around the inside of such a gear. Further, although the drawings show spur gears engaging a ring gear, the gears could be replaced with other devices such as belts, chain drives and friction drives capable of driving or being driven through their interaction.

The ratio of the number of spur gear teeth to ring gear teeth can be modified. Doing so changes the angular distance that rotor 310 travels for each rotation of the spur gears, e.g., gears 450 and 456.

Flanges 612 and 618 of main crankshaft 610 may extend through bores 244 and 246 in front and rear plates 230 and 232 (FIG. 2). Having only one flange protrude from housing 200 may be acceptable, however. The crankshaft flanges may extend through respective openings 252 and 254 of crankshaft collars 248 and 250. Fasteners (not shown) through openings 256 in front crankshaft collar 248 engage bores 258 in front plate 230, and corresponding fasteners secure the rear collar 250 to the rear plate. Those parts are unnumbered. See also FIG. 1. Each collar may have seals (not shown) around the inside of openings 252 and 254. A timing mark mount hole 260 (FIG. 2) also may be provided.

Front and rear plates 230 and 232 may include oil ring seal groove 238 (only shown on plate 232 in FIG. 2). Corresponding ring seals (only seal 532 is visible in FIG. 2 and shown in FIG. 18) seat in the ring seal grooves to create a seal between the front and rear rotor ring plates 396 and 398 and the insides of front and rear housing plates 230 and 232 when those plates attach to housing body 202. The ring plate seals may include an annular shoulder 530, which faces and is contact with the ring plates. The ring plate seals may be cast iron, silicon graphite, carbon fiber or other appropriate material. Springs (not shown) may bias the ring plate seals toward the front and rear ring plates.

Ring plate seals 532 remain stationary with respect to housing plates 230 and 232 during rotor rotation. Thus, the rotor's ring plates 396 and 398 slide on the ring plate seal. The ring plate seals have an rim shoulder 534 as FIG. 18 shows. Gaskets (not shown) also may seal plates 230 and 232 to the housing body. Other devices or systems may be provided to prevent galvanic corrosion due to any dissimilar metals being in contact with each other.

Figure 16:
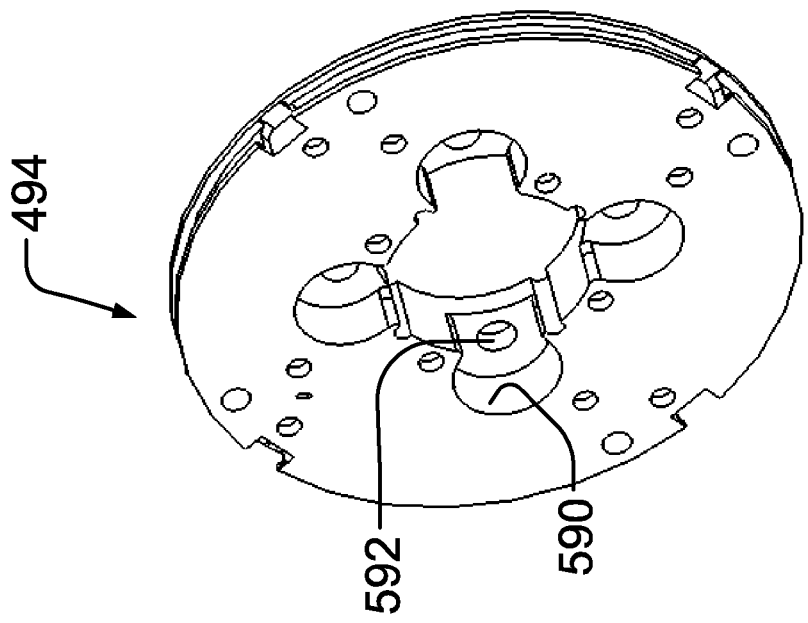
FIGS. 15 and 16 are perspective views of alternative ring plates of the rotary engine.
Figure 15:
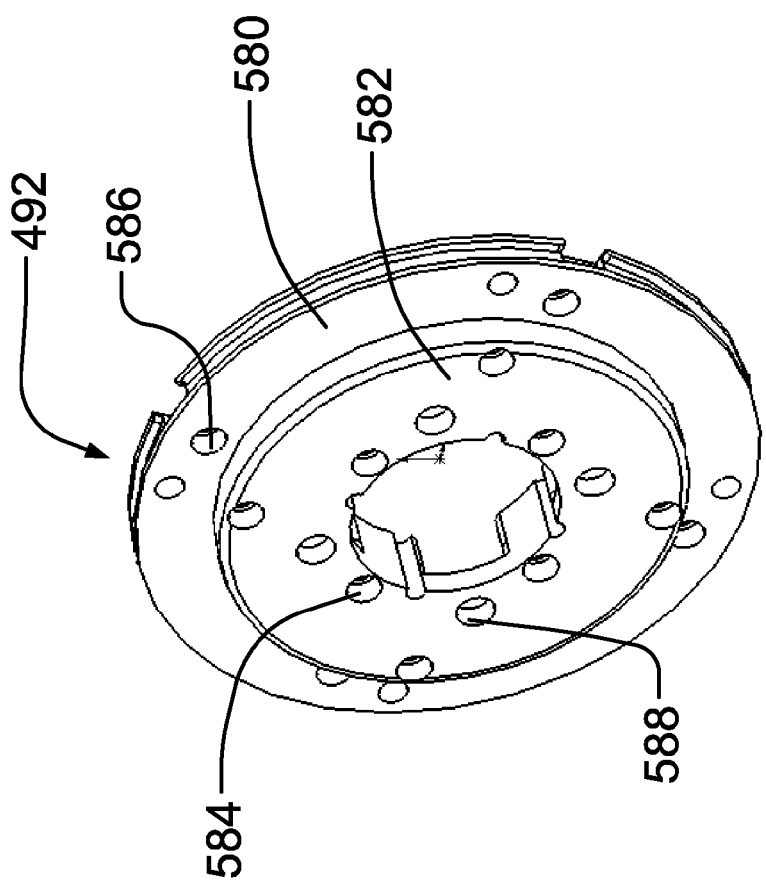

The ring plates could have different designs, and FIGS. 15 and 16 show two alternative designs for ring plates 492 and 494. Outer face 580 includes boss 582. The boss fits into a corresponding indentation on the housing front or rear plate that would be modified from end plates 230 or 232 in FIG. 2. Openings such as openings 584, 586 and 588 may serve several functions. Openings 584 and 586 and corresponding holes in ring plate 494 are for fasteners (not shown) for attaching the ring plates to the rotor. Openings 590 and 592 (FIG. 16) are for spur gear clearance and support. One opening in each quadrant may mount a pivot pin for the rotor's rockers. Instead of the cutout extending completely through the ring plates as cutout 484, 486, 488 and 490 extend in FIG. 3, the cutouts in FIGS. 15 and 16 are recesses in the inside wall of the ring plate. See, for example, recess 590 in FIG. 16. Spur gears 594 (FIG. 20), mount in each recess. Bore 588 and 592 (FIGS. 15 and 16) extends through the ring plate and receive hub 596 of the corresponding spur gear. A shaft would extend through the bore to connect a spur gear to the wheel of the outer crankshaft. Openings (not shown) also could be provided adjacent the spur gears for spraying lubrication onto the spur gears.

For the engine to operate, controlled amounts of air and fuel are injected through intake port 514 (FIGS. 9 and 10) as rocker 374 (FIG. 5) is pivoting inward. Electronic control may vary the amount of air and fuel or the air-fuel ratio. A turbocharger or supercharger could increase the volume of air (oxygen) through the intake port. As the spur gear on outer crankshaft 434 revolves about front ring gear 620 (and a corresponding spur gear revolves about rear ring gear 622), the outer crankshaft rotates. The outer crankshaft's connection through a link to rocker 374 pivots the rocker inward. The inward pivoting causes a pressure decrease in chamber 366 (marked "input" chamber in FIG. 5).

After chamber 366 receives a predetermined amount of air and fuel, rotor 310 rotation carries chamber 366 past intake port 514. Further rotation of the rotor causes outer crankshaft 434 to begin pivoting rocker 374 outward. Because the drawings are not animated and the components remain stationary, consider that chamber 366 has moved to the position where chamber 360 had been in the drawings and that the reference numerals for the parts that had been there now are used. As rocker (now 376) pivots outward, the decrease in volume in chamber 360 causes a corresponding pressure increase (compression) to the air-fuel mixture in the chamber above the rocker and in any recess 524 for a spark plug (discussed below).

The top surface of the rockers, e.g., rocker 376, may be coated. The top surface has central combustion region 402 (FIG. 7) surrounded by squish zone 408. In a piston engine, a squish zone is a narrow section of a combustion chamber in which the air-fuel mixture is more compressed than in the rest of the chamber. A squish zone helps direct the flow of the fresh air-fuel mixture and to improve scavenging, i.e., pushing exhausted gas out of the cylinder. Here, squish zone 408 is a surface area raised from surface 402 and matches the inside surface 204 (FIGS. 9 and 10) of housing body 202. This raised surface creates higher pressures around the extended edges of combustion surface 402.

Squish zone 408 may create turbulence by compressing the air-fuel mixture in the zone as the mixture reaches full compression over central combustion region 402. This may allow more complete burning of the gaseous mixture to decrease emissions. The squish zone also may improve exhausting of the remaining burnt gases. The surface of the squish zone may be 0.010 in. to 0.080 in. (0.25 mm to 2 mm) (metric equivalents are approximations) above combustion surface 402 with 0.020 in. to 0.060 in. (0.5 mm to 1.5 mm) possibly preferred.

The hot end of spark plug 520 (FIG. 4) in mount 522 extends toward chamber 360 such that spark from the spark plug can ignite the fuel. High-pressure, direct injectors may be installed into housing 202 in close proximity to the spark plug for gasoline direct injection. The hot end of the spark plug may terminate in a recess 524 in inner wall 204 of housing body 202 (FIG. 9). The recess is shown as cylindrical, but could be sized and shaped to improve combustion. The drawing show a single spark plug, but having two or more plugs for each combustion chamber may improve operation. In addition, a spark plug is shown in the drawings, but the rotary motor could work using the diesel cycle at higher pressures and without a spark plug. Those higher pressures may require different materials or different dimensions for the rotary engine's components.

The spark plug fires at a predetermined time for proper engine timing. The ignition of the fuel in the presence of air in chamber 360 causes a substantial increase in pressure in the chamber. That pressure applies a force on rocker 376 to force the rocker inward. As rotor 310 continues rotating, what had been chamber 360 rotates into the position of chamber 362 in FIG. 5. This is a movement from the compression of the chamber to the power from the chamber. Thus, rocker 370 pivots to its inward position. (FIG. 5)

Through the connection of outer crankshaft tang 436 with tang receiver 448, the inward movement rotates outer crankshaft 442. As a result, spur gears 450 and 456 rotate and travel along the outside of ring gears 620 and 622 (FIGS. 3 and 5). This, in turn, causes rotor 310 to rotate.

Continued rotation of rotor 310 positions the chamber in question to the position of chamber 364 in FIG. 5. During this rotor rotation, the spur gears associated with the rocker (now rocker 372) act on the link between the outer crankshaft and the rocker to pivot the rocker outward. The outward pivoting pushes exhaust gases through exhaust port 516 (FIGS. 2, 9 and 10). The cycle then repeats itself.

During each revolution of rotor 310, each of the four chambers sequence through four cycles: intake, compression, combustion and exhaust. By choosing the offset pivot of the rocker link, e.g., link 418 relative to its outer crankshaft 436 and to its rocker 376 (FIG. 7) and the position of its pivot pin 380, the engine can modify the timing of the intake, compression, combustion and exhaust cycles. Because the rocker's pivot is stationary, the pivot also may create an arc-shaped offset angle. For example, the rockers can have longer power and intake cycles than their compression and exhaust cycles. Those cycles may be as follows: intake=100°, compression=80°, combustion=100° and exhaust=80°. This overlap could allow each combustion cycle to fire 20° before the previous chamber has finished its power cycle. This overlap function may allow smoother transitions between power cycles.

In addition, the intake and exhaust ports 514 and 516 (FIGS. 9 and 10) may overlap so that new air and fuel enter the combustion chamber through the intake port as it opens and before the exhaust port is completely closed-off. This may allow a small rush of new air-fuel mixture to push out the remaining exhaust gases drawing in a completely new charge of fuel and air. The intake/exhaust overlap may be from 4° to 24°, and preferably may be 8°.

Note that only the outer crankshaft positioned with the rocker moving from combustion-caused expansion receives power directly from that combustion-caused pressure acting on the rocker. Through rotation of that outer crankshaft's spur gear acting on ring gears 620 and 622, rotor 310 rotates. At the same time, continued rotation of the rotor causes the spur gears for the other three outer crankshafts to rotate, which, in turn pivots the rocker associated with the crankshaft to pivot in or out. However, as each spur gear moves to the power/combustion position where the air-fuel mixture ignites, expanding gases drive the rotor inward. Consequently, that set of spur gears become the driving gears, and the other spur gears become driven gears.

The rear face of front ring plate 396 and the front face of rear ring plate 398 are against the respective sides of rotor 310. Each side of the rotor may have a sealing groove 530 that may run along the periphery of the arms. See FIGS. 5, 6a and 6b. Only groove 530 is visible in the drawings. Rotor seal cord may be installed in the sealing grooves on both sides of rotor to seal the arms to ring plates 396 and 398.

Main crankshaft 610 extends through collar 248 (FIG. 1). If the rotary engine is used on a vehicle, the main crankshaft connects to the rest of the vehicle's drive train, e.g., transmission, clutch or other component. For non-vehicle uses for machines such as pumps and compressors, the crankshaft connects to the driven device. The main crankshaft also could be driven if the device is used as a compressor or pump. (See FIG. 19). The main crankshaft also may extend out either side or both sides of the housing.

Components may have channels and openings for coolant and lubricant. These are not explained in detail and may vary with different engine sizes and designs. However, see openings 346 and 348 (FIGS. 6a, 6b and 11), which could be used for cooling or lubrication. The arms also may have oil jets, e.g., jet 338 (FIG. 11) for providing lubrication in the chambers. These oil jets may be pressure or movement activated, allowing oil to pass only when desired. Other physically activated (pressure or movement) oil jets may be placed on various component parts, such as the front and rear plates 230 and 232 (FIG. 2) for controlled oiling of moving parts. Components and parts may have bushings or bearings (not shown) where needed for reducing friction, metal to metal contact protection, or holding desired tolerance specifications. Oil vacuum ports on the front and rear plates 230 and 232 (FIG. 2) may be placed at the lowest available gravitational oil collection area, depending on the physical mounting position of the engine, to extract oil away from moving parts. Parts also may have cutouts to decrease weight or provide better heat dissipation.

Figure 4:
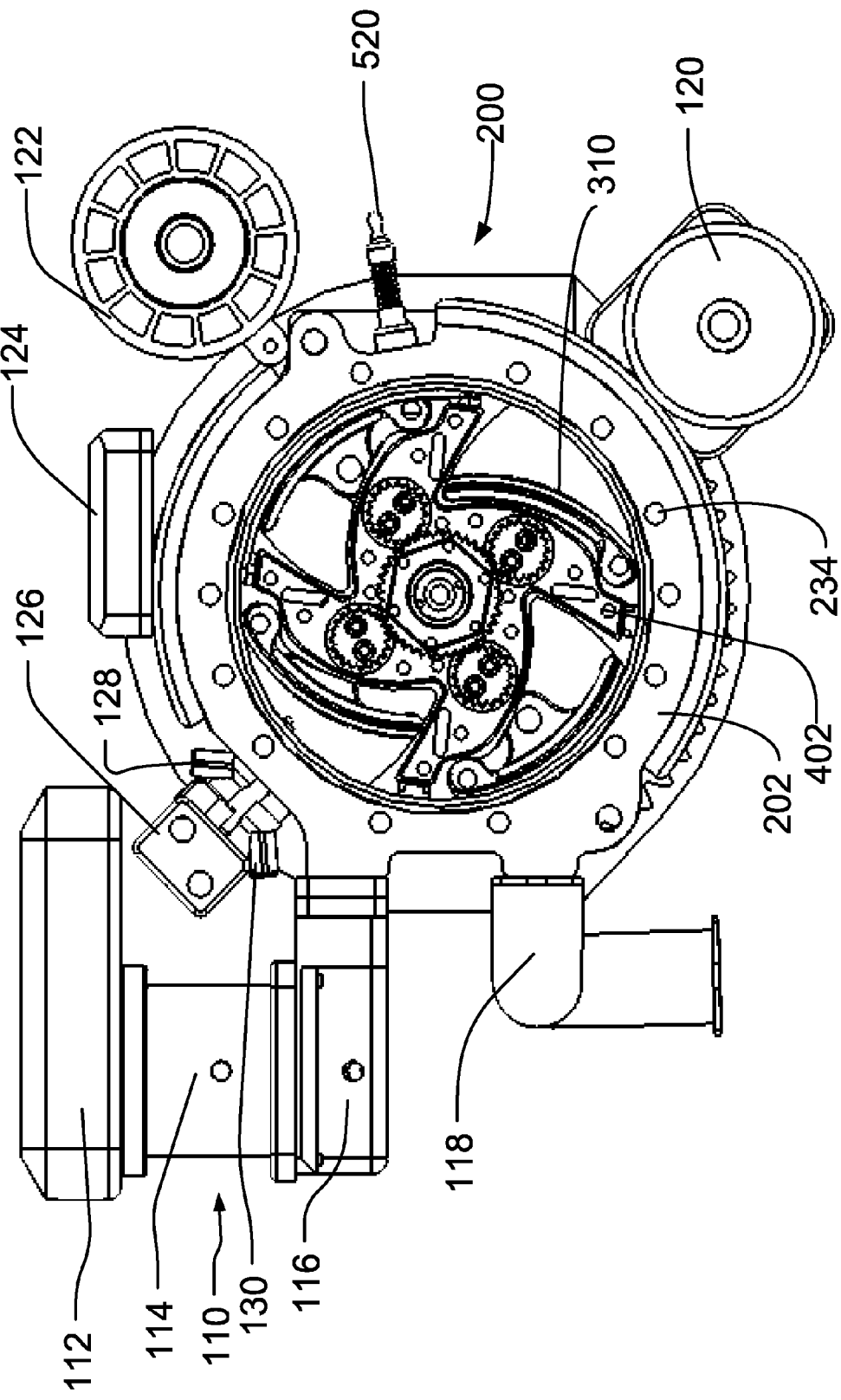
FIG. 4 is front cut-away view of the rotary engine.

FIG. 4 shows some additional parts of the rotary engine in a vehicle. The air intake system 110 may include air filter 112 on throttle body 114, which connects to intake manifold 116. Air from the intake system flows into intake chamber 366 (FIG. 5). Fuel injector 126 also is positioned near the intake chamber. The engine may be designed to burn different fuels, e.g., gasoline, ethanol, CNG, LNG, propane, or hydrogen. The fuel injector of such an engine could have separate outlets 128 and 130 for different fuels. Exhaust from chamber 364 passes into exhaust header 118 and into the remainder of the exhaust system. Starter motor 120 and alternator 122 and engine electronics in an electronic control unit 124 also attach to housing 200.

The size of the engine compartment and the position of the rotary engine in the engine compartment may affect the various components' locations insofar as they must fit in the compartment and may need to be accessible for service.

Belts or other connectors (not shown) may drive the alternator and other devices from engine power.

Figure 13:
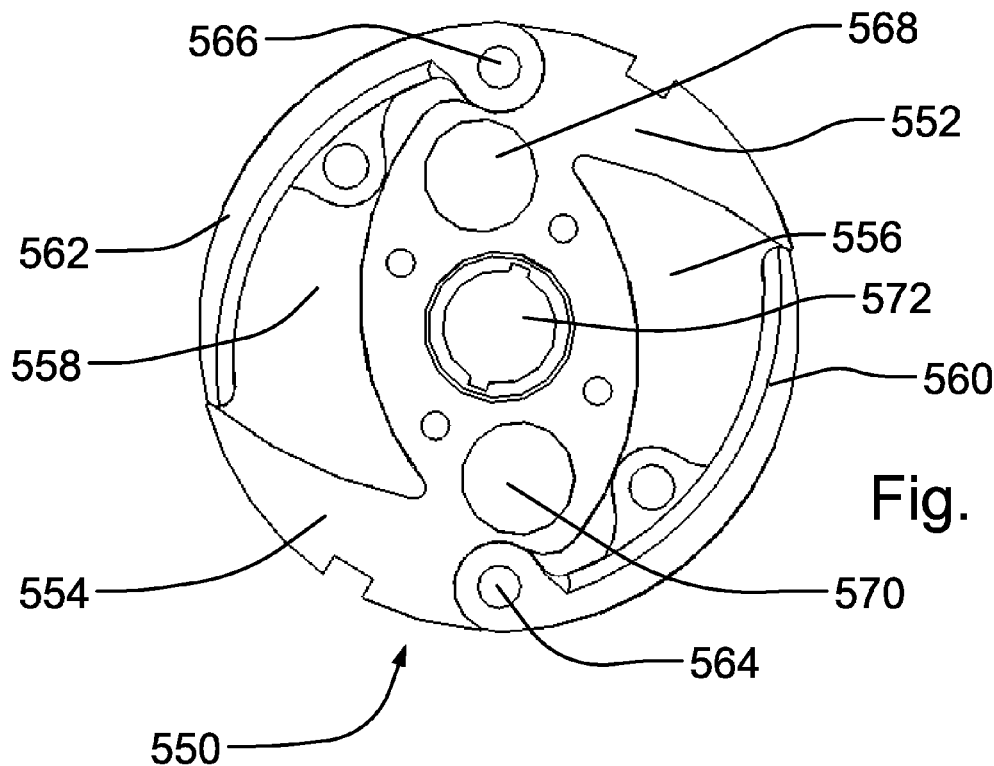
FIG. 13 is a front view of a two-cycle rotor.

FIG. 13 shows a two-chambered rotor for a rotary engine. Rotor 550 rotates twice for each power engine power stroke. The rotor has two arms 552 and 554 that may be shaped as shown in FIG. 13. The arms form two opposite chambers 556 and 558. Rockers 560 and 562 mount on respective pins 564 and 566. Outer crankshafts (now shown) connect to rockers through linkage similar to that shown in FIG. 7. Each crankshaft may have spur gears (now shown) at the outer crankshaft end that protrude through bores 568 and 570 from the rotor. A main crankshaft (not shown) protrudes from center bore 572. Stationary ring gears (not shown) mount to stationary housing structure.

In one position in FIG. 13, the air-fuel mixture is injected or otherwise enters one of the chambers, e.g., chamber 556. As rotor 550 rotates, rocker 560 pivots outward to compress the air-fuel mixture until, at or close to full compression, a spark ignites the air and fuel. The rotor rotates without exhausting the exhaust gases until the rotor returns to its initial position, i.e., where chamber 556 is in FIG. 13. Valves (not shown) control intake and exhaust from chambers 556 and 558. One or more valves open to allow the air-fuel mixture to enter chamber 556, and then one or more different valves open to allow the exhaust gases to enter the exhaust system.

The rotary engine that has been described is a four-stroke engine, intake, compression, combustion and exhaust. In a four-stroke piston engine, those strokes occur every two rotations or the crankshaft. Two-stroke piston engines complete a cycle in two movements of the piston, in and out. The rotary engine could be modified into a two-stroke engine. Two- and four-stroke designs have advantages and drawbacks relative to each other.

A typical use of internal combustion engines is in vehicles. Just as piston engines come in different sizes, compressions, power rating and other factors for different vehicles, the rotary engine's specifications can vary. Insofar as the rotary engine powers generators, pumps, machinery or other devices, the engine may have different designs. Some might require higher speed but less low-speed torque. Other application may require high torque at low speed. Some application may require constant output over long periods. Adjusting the combustion chamber volume, the size and pivoting angle of the rockers and other factor of the rotary engine may be modified to satisfy an engine's requirements.

At least two ways allow matching output power to power needs. The first is to have larger combustion chambers with larger rockers. Increasing the diameter of rotor 310 may allow the rockers to pivot through a larger angle to increase displacement. Likewise, increasing the width of the rotor also increases the displacement of each chamber. Optimizing performance may require balancing the effect of increasing the rotor's diameter and width. For example, increasing dimensions weight of all components and may affect other engine components or engine symmetry.

Stacking two or more power modules along the main crankshaft also could combine the modules' power output. In addition, combinations of different sized power modules can be assembled into one unit.

Figure 14:
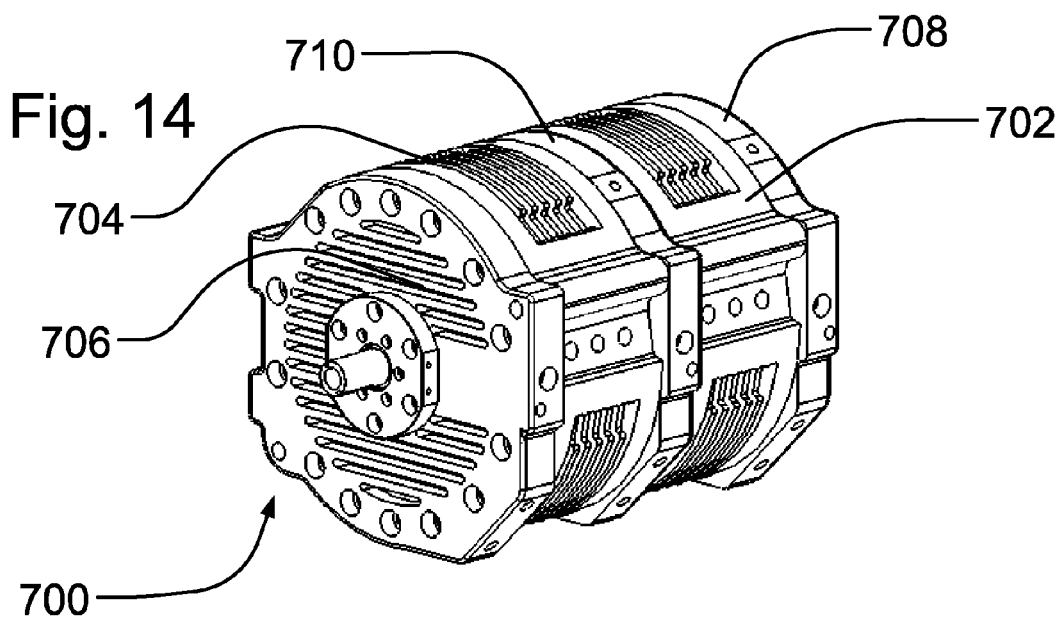
FIG. 14 is a perspective view of an engine using two rotary engines.

FIG. 14 shows a duel unit 700 comprising a front unit 702 and rear unit 704. The front unit is bounded by front plate 706 and center plate 710, and the rear unit is bounded by rear plate 708 and center plate 710. In FIG. 14, the locations where combustion occurs are on the same side of the housing, but they could mount 180° apart. Likewise, with more rotors for one engine, the location where combustion occurs could be spaced evenly around each housing, e.g., 120° apart for three rotors and 90° for four rotors.

Though the configuration just described are internal combustion engines, the device with modifications can become a compressor. Compressor 800 (FIG. 19) comprises housing body 802. Compressors may be free-standing. Therefore, the compressor may include base 804. The housing body has a cylindrical opening 806 in which a rotor (not shown) mounts for rotation. Front and rear housing plates (not shown; similar to pates 230 and 232 in FIG. 2) cover the rotor and cylindrical opening. Seals 810 and 812 may seal the housing plates to the housing body, and fasteners (not shown) extending through openings in the housing plates may attach to bores 808 in the housing body. The main crankshaft extends through the housing plates and connect to a separate motor or engine. When the device is used as a compressor, the main crankshaft is driven instead of providing the motive force.

Figure 19:
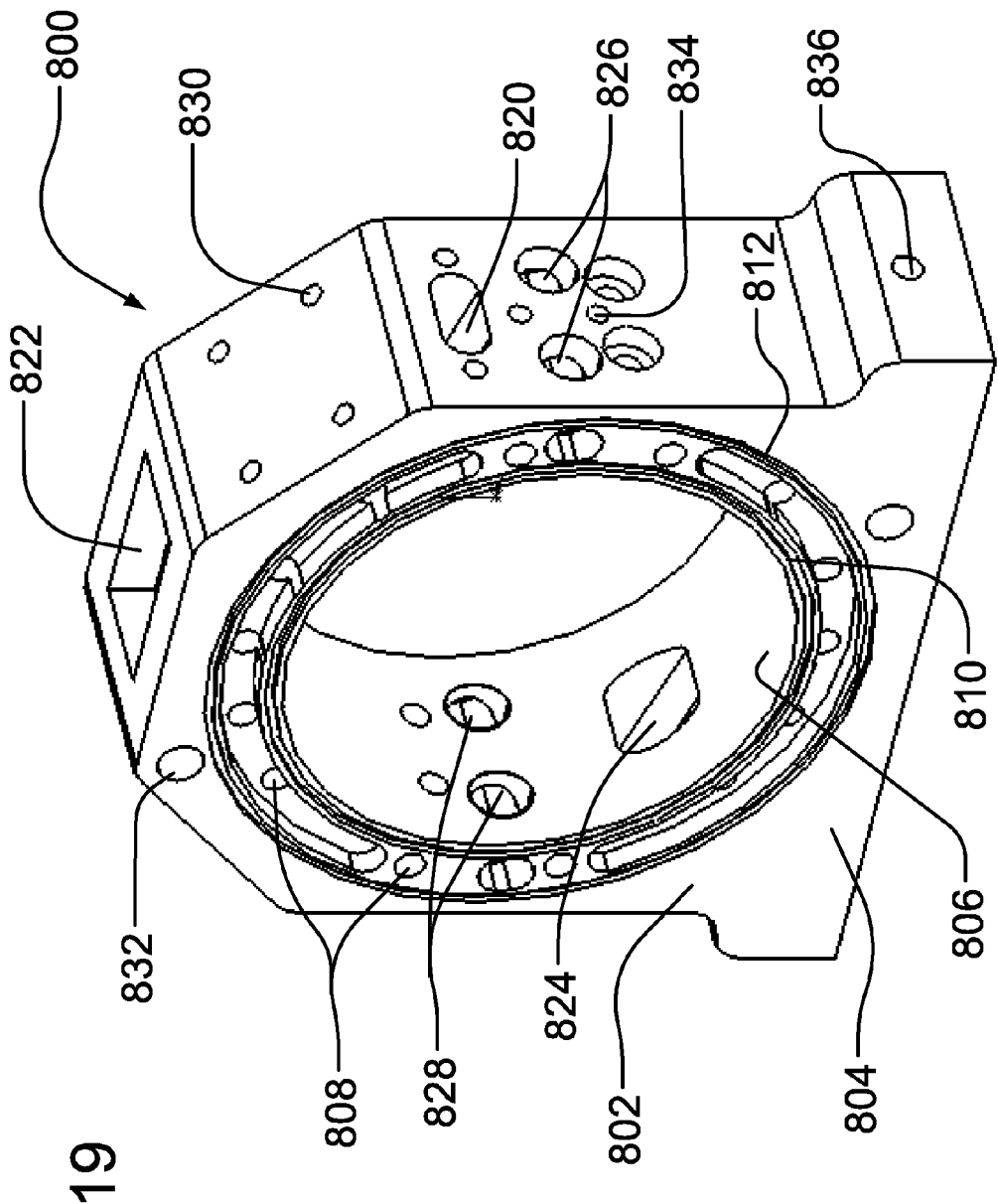
FIG. 19 is a perspective view of a housing for a compressor used with the rotor.

Housing body 802 includes one or more inlets 820 and 824 and one or more outlets 826 and 828 (FIG. 19). These inlets and outlets could be used for high pressures such as for hydraulic pressurization. Valves may be provided for any inlets or outlets, and their construction and operation may depend on the fluid volume and pressure. Various bore such as bores 830, 832, 836 and 838 may be provided for fastening related devices, such as inlets and outlets for lubrication.

Rotor rotation causes the rockers to pivot in an out. The inlets are positioned to receive air, other gas or liquid ("fluid") either from the atmosphere in the case of air or from a source of fluid. The fluid flows into one of the rotor chambers as the rocker pivots inward to lower the pressure. When the rotor rotates away from the inlet, the rocker pivots outward to compress the fluid and force it through an outlet. With a four-chambered rotor, the rotor rotates to another inlet, draws fluid into the chamber and then compresses the fluid as the rotor moves adjacent another outlet.

Four strokes are not necessary. Thus, pressurized fluid can flow out an outlet at all compression strokes (pivoting outward of the rocker). Accordingly, the rotor could have two, four, six or more chambers with a corresponding number of rockers and outer crankshafts subject to space limitations.

Figure 21:
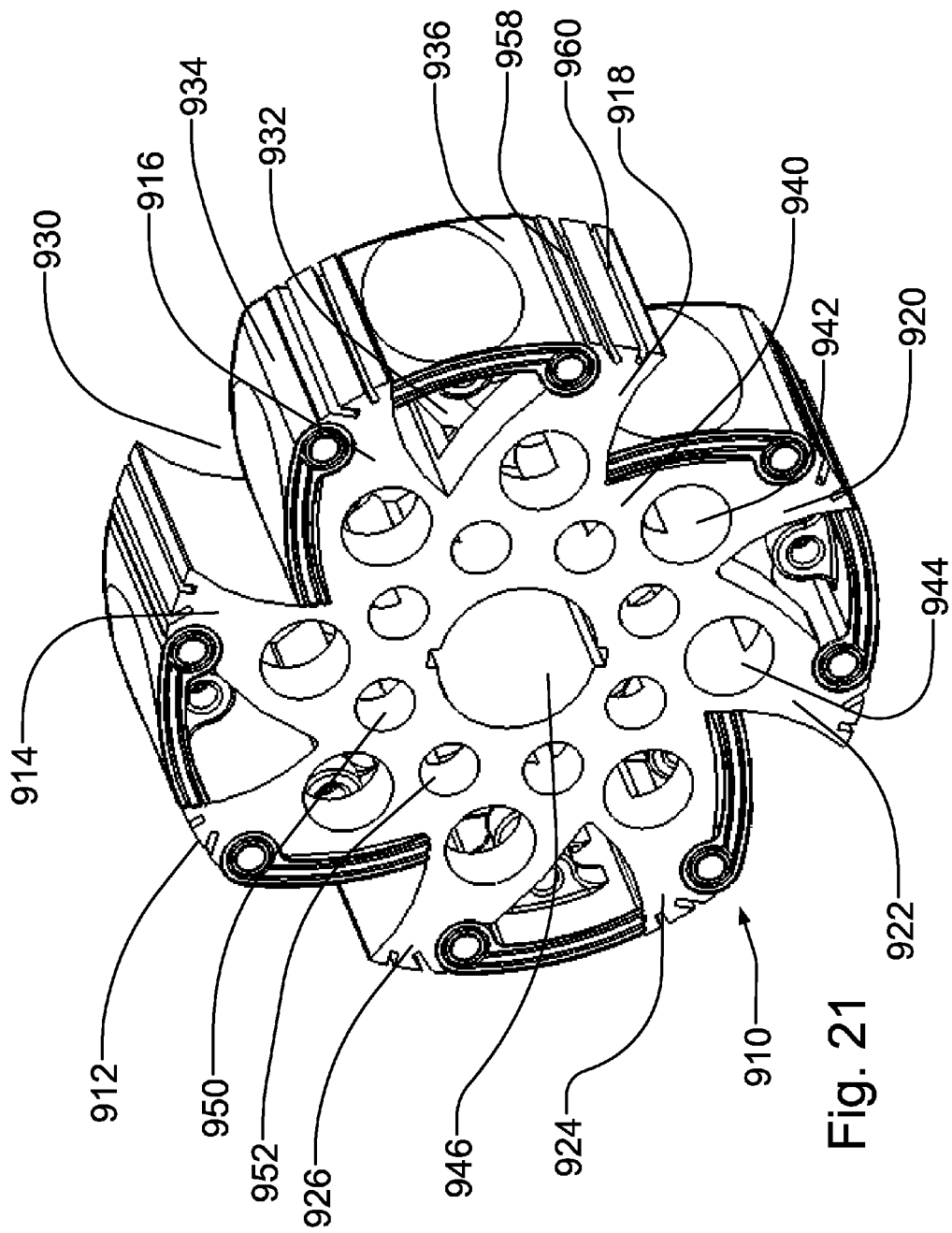
FIG. 21 is a perspective view of another alternative rotor for the rotary engine.

FIG. 21 illustrates a rotor with eight chambers, which may be particularly useful as a heavy-duty diesel unit. Because FIG. 11 has reference numerals for its components, and FIG. 21 shows components with related functions, the description of FIG. 21's parts is abbreviated.

Rotor 910 has eight arms 912, 914, 916, 918, 920, 922, 924 and 926. Adjacent arms form eight chambers such as chamber 930 between arms 914 and 916 and chamber 923 between arms 916 and 918. The inner cylindrical wall (not shown) of the housing receiving rotor 910 forms the outside of each chamber. Rocker 934 mounts near the distal end of arm 916 and pivots in and out of chamber 930. It is shown in FIG. 21 Similarly, rocker 936 mounts near the distal end of arm 918 and pivots in and out of chamber 932. FIG. 21 shows its outward position. the rotor also mounts six other rockers, which are not numbered.

The rotor is formed of front plate 940 and a corresponding rear plate, which is not visible in FIG. 21. Bores such as bores 942 and 944 extend through the rotor's front plate, and corresponding and aligned bores (not shown) extend through the rear plate. Properly sized wheels mount in the bores, and spur gears mount to the wheels and extend out of the bores. FIG. 21 shows neither the wheels nor the spur gears. The drawing also does not show a ring gear mounted on a main crankshaft extending through central bore 946. The spur gears engage the ring gear and rotate as the rotor rotates about its axis. Linkages between the wheels and the rockers cause the rockers to pivot in and out of their respective chambers as the rotor rotates. However, when fuel ignites in the chamber that is then the power chamber, force from the expanding gas on the rocker rotates the wheels and spur gear. That rotation acts on the ring gear to rotate the rotor.

The rotor may have additional bores such as bores 950 and 952 to decrease weight. The bores also may carry lubricant.

The outside of each arm that contacts or is close to contact with the cylindrical wall of the housing may have two grooves, e.g., grooves 958 and 960, which receive seals (not shown). Other seals for sealing the chambers and the rotor itself are not shown.

In the eight-chamber version, the air-fuel mixture ignites simultaneously in two chambers on opposite sides of the housing. Thus, during each rotor rotation, each chamber completes eight cycles (intake, compression, power, exhaust, intake, compression, power, and exhaust). Engines with 12, 16 or more chambers per rotor are contemplated. They may be particularly useful for large and heavy equipment such as earth movers, mining dump trucks, and cranes.

When detailed descriptions reference one or more drawing figures, the element being discussed is visible in that drawing. The element also may be visible in other figures. In addition, to avoid crowding of reference numerals, one drawing may not use a particular reference numeral where the same element is in another drawing with the reference numeral.

The description is illustrative and not limiting and is by way of example only. Although this application shows and describes examples, those having ordinary skill in the art will find it apparent that changes, modifications or alterations may be made. Many of the examples involve specific combinations of method acts or system elements, but those acts and those elements may be combined in other ways to accomplish the same objectives. With regard to flowcharts, additional and fewer steps may be taken, and the steps as shown may be combined or further refined to achieve the methods described. Acts, elements and features discussed only in connection with one embodiment are not intended to be excluded from a similar role in other embodiments.

"Plurality" means two or more. A "set" of items may include one or more of such items. The terms "comprising," "including," "carrying," "having," "containing," "involving," and the like in the written description or the claims are open-ended, i.e., each means, "including but not limited to." Only the transitional phrases "consisting of" and "consisting essentially of" are closed or semi-closed transitional phrases with respect to claims. The ordinal terms such as "first," "second," "third," etc., in the claims to modify a claim element do not by themselves connote any priority, precedence, or order of one claim element over another or the temporal order in which acts of a method are performed. Instead, they are used merely as labels to distinguish one claim element having a certain name from another element having a same name (but for use of the ordinal term). Alternatives such as "or" include any combination of the listed items.

I claim:

1. A rotary device comprising:
   a housing;
   a rotary module mounted for rotation in the housing, the rotary module comprising,
   a rotor comprising a center portion and a plurality of arms extending radially outward from the center portion, the center portion and the plurality of arms defining at least one chamber extending radially outward from the center portion and between adjacent arms of the plurality of arms, at least one arm of the plurality of arms including a bore;
   at least one rocker within the at least one chamber and configured to seal at least a portion of the chamber during operation of the rotary device, the at least one rocker operably connected to a first driver such that the first driver rotates as the at least one rocker pivots within the chamber, wherein the first driver is within the bore;
   a second driver operably coupled to the first driver whereby rotation of the first driver causes the first driver to rotate about the second driver; and
   at least one output member operably connected to the rotor and configured to rotate in response to rotation of the first driver about the second driver.

2. The rotary device of claim 1 wherein the rotor has an axis of rotation, the at least one rocker having a first end and a second end opposite the first end.

3. The rotary device of claim 2 further comprising a seal located along the second end of the rocker, the seal configured to bias against a surface that conforms to the path traveled by the second end of the rocker.

4. The rotary device of claim 1 wherein the at least one rocker has a groove extending at least partially around the rocker and a sealing member seated in the groove.

5. A rotary engine comprising:
   a housing having an inner surface, a front enclosure, and a rear enclosure;
   a rotor mounted in the housing, the rotor comprising a center portion and a plurality of arms extending radially outward from the center portion, the center portion and the plurality of arms defining at least one chamber extending radially outward from the center portion and between adjacent arms of the plurality of arms, at least one arm of the plurality of arms including a bore;
   at least one rocker within the at least one chamber and configured to seal at least a portion of the chamber during operation of the rotary engine, the at least one rocker further configured to pivot between an inside position spaced from the inner surface of the housing and an outside position adjacent the inner surface of the housing;
   an outer crankshaft connected to the at least one rocker and configured to rotate in response to pivoting of the at least one rocker between the inside and outside positions, the outer crankshaft having a first driver configured to rotate with rotation of the outer crankshaft, wherein the first driver is within the bore;
   a second driver operably connected to the housing and configured to engage the first driver whereby rotation of the outer crankshaft causes the first driver to travel about the second driver; and
   a main crankshaft operably connected to the rotor and extending out of the housing, the main crankshaft configured to rotate with the rotor.

6. The rotary engine of claim 5 wherein the first driver is a spur gear and the second driver is a gear.

7. The rotary engine of claim 5 wherein the rotor has an axis of rotation, at least two arms of the plurality of arms extending outward from the axis of rotation, wherein the at least one rocker is positioned between two adjacent arms, the at least one rocker having a first end and a second end opposite the first end.

8. The rotary engine of claim 7 further comprising a seal located along the second end of the at least one rocker, the seal being biased configured to bias against the surface that conforms to the path traveled by the second end of the at least one rocker.

9. The rotary engine of claim 5 wherein the rotor has an axis of rotation, the rotor comprising four arms extending outward from the axis of rotation the at least one rocker having a first end and a second end opposite the first end.

10. The rotary engine of claim 9 further comprising an inlet through the housing for injecting an air-fuel mixture into a chamber.

11. The rotary engine of claim 10 further comprising a spark plug configured to ignite an air-fuel mixture in the chamber containing the air-fuel mixture.

12. The rotary engine of claim 11, wherein the at least one rocker is configured to move toward the housing to compress an air-fuel mixture before the spark plug ignites the air-fuel mixture.

13. The rotary engine of claim 9 further comprising a spark plug configured to ignite an air-fuel mixture within a chamber.

14. The rotary engine of claim 5 wherein the rotor has an axis of rotation, at least two arms of the plurality of arms extending outward from the axis of rotation, each arm of the plurality of arms having a thickness extending between two spaced-apart sides, wherein the outer crankshaft is mounted on an arm and positioned adjacent the two spaced-apart sides, such that the first driver extends outside the spaced-apart sides.

15. The rotary engine of claim 5 wherein the at least one rocker has a rocker surface facing the inner surface of the housing, the rocker surface having a central section and a squish section at least partially around the central section and having a surface raised from the central section.

16. The rotary engine of claim 5 wherein the at least one rocker has a groove extending at least partially around the at least one rocker and a sealing member seated in the groove.

* * * * *